United States Patent [19]

Hoang

[11] Patent Number: 5,357,811
[45] Date of Patent: Oct. 25, 1994

[54] SINGLE TUBE CORIOLIS FLOW METER WITH FLOATING INTERMEDIATE SECTION

[75] Inventor: Danny Hoang, Santa Clara, Calif.

[73] Assignee: Exac Corporation, San Jose, Calif.

[21] Appl. No.: 833,767

[22] Filed: Feb. 11, 1992

[51] Int. Cl.⁵ .............................................. G01F 1/84
[52] U.S. Cl. .................................................. 73/861.38
[58] Field of Search ......................... 73/861.37, 861.38

[56] References Cited

U.S. PATENT DOCUMENTS

| | | |
|---|---|---|
| Re. 31,450 | 11/1983 | Smith . |
| 4,127,028 | 11/1978 | Cox . |
| 4,192,184 | 3/1980 | Cox . |
| 4,660,421 | 4/1987 | Dahlin . |
| 4,711,132 | 12/1987 | Dahlin . |
| 4,957,005 | 9/1990 | Yard . |
| 4,984,472 | 1/1991 | Dahlin . |
| 5,020,375 | 6/1991 | Back-Pedersen et al. . |
| 5,060,523 | 10/1991 | Lew .................................... 73/861.38 |
| 5,078,014 | 1/1992 | Lew .................................... 73/861.38 |
| 5,131,280 | 7/1992 | Lew .................................... 73/861.38 |

OTHER PUBLICATIONS

"Sensors: The Journal of Machine Perception"; vol. 2 No. 12 (Dec. 1985); pp. 6-10.
"Micro Motion Mass Flow Meter Remote Electronics Instruction Manual"; sections 1.5, 2.2.5; pp. 2-10 (Sep. 1983).

*Primary Examiner*—Herbert Goldstein
*Attorney, Agent, or Firm*—Claude A. S. Hamrick

[57] ABSTRACT

Single tube Coriolis flowmeter with floating intermediate section including an elongated upstream inlet conduit section, an elongated downstream outlet conduit section laterally offset from the inlet conduit section, an inlet-outlet plate rigidly connecting the inlet and outlet conduit sections together at their proximate ends, and a continuous and generally helically wound length of conduit (approximately a 720-degree coil), the ends of which are respectively continuations of the inlet and outlet conduit sections. The helically wound length of conduit includes an upstream metering loop section and a downstream metering loop section joined together by a "floating", unsupported intermediate conduit section. The upstream ends of each metering loop section are coupled by a first connecting plate, while the downstream ends of each metering loop section are coupled by a second connecting plate. The otherwise unsupported intermediate conduit section extending between the first and second connection plates connects the upstream metering loop section outlet to the downstream metering loop section inlet. The intermediate section and the inlet-outlet plate are not connected to each other and are free to move relative to one another. The driver-oscillator device(s) is mounted between the two loop sections to impart equal and opposite exciting forces to the loop sections and the sensors are mounted between the loop sections to detect Coriolis force induced responses to the excited loop motions.

18 Claims, 12 Drawing Sheets

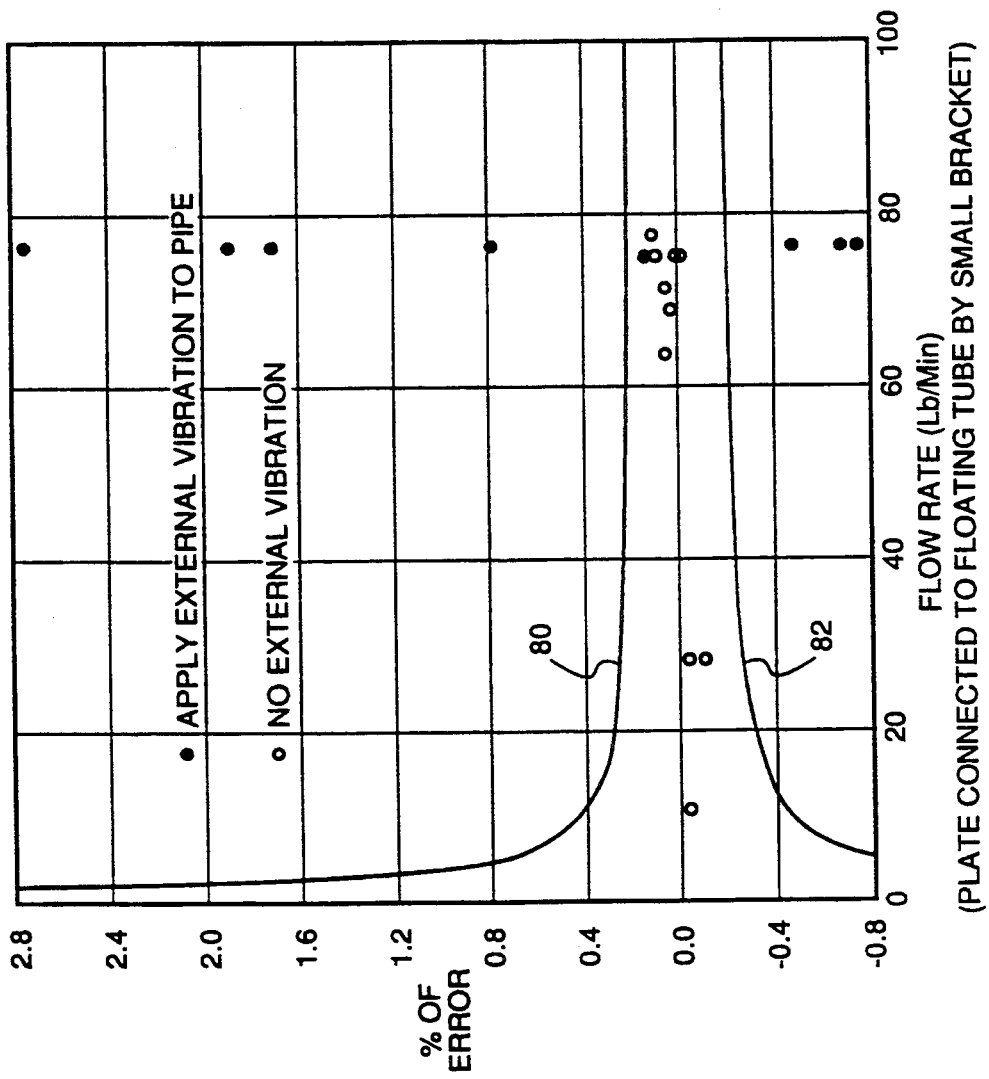

(AXIAL LOAD ON PIPE)

(CORIOLIS LOAD)

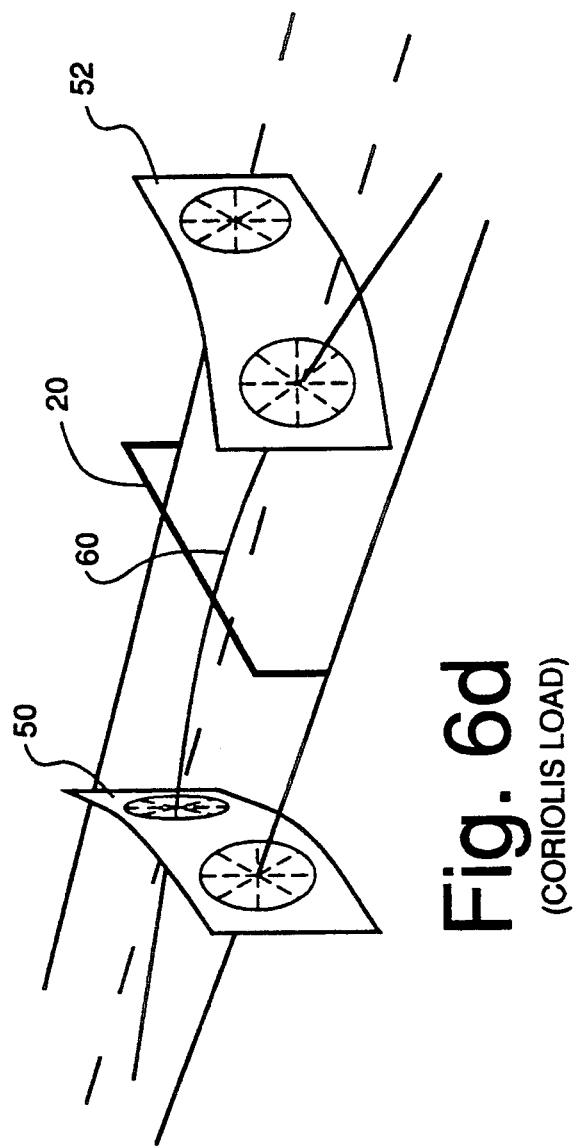

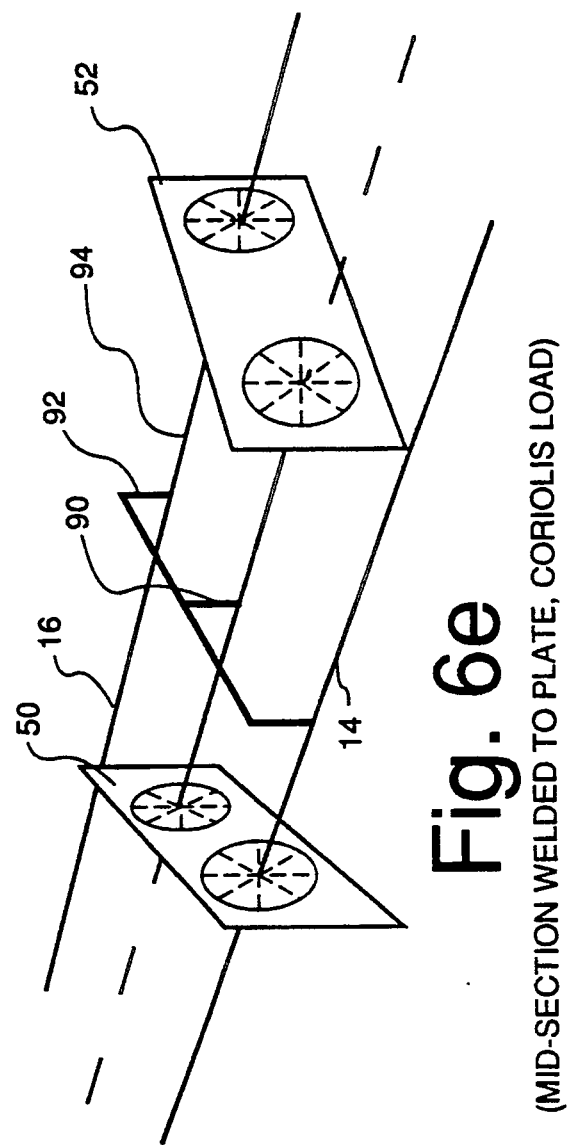

SINGLE TUBE CORIOLIS FLOW METER WITH FLOATING INTERMEDIATE SECTION

BACKGROUND OF THE INVENTION

1. Field of the Invention

The present invention relates generally to Coriolis type mass flowmeters and more particularly to an improved single tube flowmeter which is substantially insensitive to external pipeline vibrations, and is substantially insensitive to external pipeline stresses and distortions. The flowmeter includes an intermediate section of conduit which functions to prevent mechanical coupling of the Coriolis response to the external piping and provides dynamic counterbalancing of internally generated Coriolis forces, The flowmeter does not require the use of a support structure.

2. Brief Description of the Prior Art

There is a continuing need for more accurate and efficient meters for determining the mass flow rate of fluids and/or liquid-solid slurries flowing through a pipeline or conduit. Coriolis-effect type mass flow rate meters used for this purpose are well known in the prior art. For example, U.S. Pat. No. 4,127,028 to Cox et al. discloses a mass flowmeter comprised of a pair of generally U-shaped tubes that are spaced apart in parallel with the inlet and outlet ends of each U-tube fixedly cantilever-mounted and with the corresponding bight ends free to move relative to one another. The tube's bight ends are connected by a drive mechanism which oppositely reciprocates the tubes like the tines of a tuning fork. A sensor is placed at the corresponding side leg of each U-tube.

Micro Motion ® Model DL Mass Flowmeter Information and Specification Manual discloses a Coriolis type mass flowmeter similar to the '028 Cox device wherein a pair of generally U-shaped tubes are spaced apart with the inlet to the upstream U-tube and the outlet from the downstream U-tube fixedly mounted and with the corresponding bight ends free to move relative to one another. The Micro Motion ® device and the '028 Cox device differ in that in the Cox device the connecting linkage between the upstream U-tube and the downstream U-tube are fixedly mounted to the device base fixture. In the Micro Motion ® device, the tubes are formed from what appears to be a continuous length of conduit, the ends of which are fixedly mounted to the support structure.

U.S. Patent No. Re. 31,450 to Smith discloses a Coriolis type mass flowmeter similar to the Micro Motion ® and Cox devices but is comprised only of a single U-shaped tube fixedly attached to a support in a cantilever fashion with the bight end free to move. At Smith '450, col. 3 lines 44–51, the function of the cantilevered beam-like mounting of the U-shaped tube is stated:

"The cantilevered mounting of the "U" shaped conduit is of more than passing significance. In the instance in which distortion is measured, such mounting provides for the distortion resulting from the Coriolis forces to be offset substantially entirely by resilient deformation forces within the conduit free of mechanical pivot means other than flexing of the conduit."

U.S. Pat. No. 4,957,005 to Yard discloses a Coriolis type mass flowmeter which is comprised of a series of loops formed in a single length of tubing with no joints. The loops, arranged in order, include an inlet isolation loop, an upstream metering loop, a downstream metering loop, and an outlet isolation loop. The junction between the inlet isolation loop and the upstream metering loop, the junction between the two metering loops, and the junction between the downstream metering loop and the outlet isolation loop are all rigidly mounted to a single bracket. The bracket is free to move relative to a support structure for the meter, thereby isolating the double loop structure from external forces and vibrations.

U.S. Pat. No. 5,020,375 to Back-Pedersen et al. discloses a Coriolis type mass flowmeter comprised of an upstream measuring tube loop, a downstream measuring tube loop, an upstream or inlet final tube, a downstream or outlet final tube, a first block, a second block, an inlet connecting tube, and an outlet connecting tube. The two measuring loops are formed in a single length of tubing bent several times. The transition point between the two measuring loops, the inlet to the upstream measuring loop, and the outlet from the downstream measuring loop are all captured in the second block. An end of the inlet connecting tube is connected to the inlet to the upstream measuring loop, and this connection is captured in the second block. In a similar manner, an end of the outlet connecting tube is connected to the outlet from the downstream measuring loop and this connection is also captured in the second block. The opposite ends of the inlet and outlet connecting tubes are captured in the first block as are one end of each of the upstream and downstream final tubes. The connecting tubes are attached to their corresponding final tube sections.

U.S. Pat. Nos. 4,660,421, 4,711,132, and 4,984,472 to Dahlin et al. disclose a Coriolis type mass flowmeter that is comprised of a single tube length formed into at least one helically shaped loop, wherein the inlet and outlet ends of the tube are fixedly mounted to a support and disposed at opposing ends of the flowmeter.

A significant disadvantage with prior art flowmeter devices such as those mentioned above is that the support or base of the meters must be mounted in a rigid and secure manner. The prior art devices are thus very sensitive to pipeline stresses, pipeline distortions and to the mounting configuration of the meter and will give inaccurate readings if the device is improperly mounted or supported. In other words, the prior art devices have a high mounting sensitivity. For example, the Micro Motion ® Model DL meter is very sensitive to the mechanical coupling of the meter to the outside world. (Refer to *Micro Motion ® Model DL Information and Specification Manual*, Section 2.4.) If the mounting is changed, the response motion and the excitation motion can couple to the external environment resulting in flow rate errors caused by zero-flow offset shifts and calibration shifts. This coupling sensitivity of the meter to the external environment is evident in the Cox, Dahlin, and Yard devices. Although attempts have been made in the design of these prior art devices to enhance the isolation capability of their meters by using support structures that are heavy and/or rigid, such structures materially add to the cost of the device and complicate the installation.

Another disadvantage of the prior art metering devices is that stresses in the flowmeter support or base are readily transmitted to the metering tubes resulting in inaccurate mass flow rate readings. For example, the Cox type of prior art mass flow meter is highly sensitive to external vibrations which may interfere with accurate measurement. In order to isolate the meters from the outside environment, attempts are made to make the tubing support structure as rigid as possible. This also results in massive and/or expensive supports that are still sensitive to mounting and piping support configurations and accommodations.

Also, some prior art devices, specifically the Yard and the Back-Pedersen et al. devices, attempt to isolate the external vibrational environment by physically decoupling the metering tube section from the mounting section. In the Yard device, as described earlier, a continuous double loop metering section is mounted at these points to a rigid bar that "floats" with respect to the support structure of the metering device itself. In the Back-Pederson et al. device, a continuous tube, double loop metering section is tied into a block in hydraulic communication with another block which is used to attach the metering device to the external system piping or tubing. In both devices the metering section of the flowmeter is isolated, to some extent, from the external vibrational environment. Also, in both devices, the inlet and the outlet from the metering tube loops, and the junction between the upstream and downstream metering loops are all tied together in one rigid block structure. A problem with these configurations is that they do not cancel, or dynamically counterbalance, the forces that result during excitation and response of the sensing tubes thereby resulting in inaccurate flow rate readings.

Yet another disadvantage of the '028 Cox and the Micro Motion ® devices is that the oscillatory drive motion creates significant bending stresses at the attachment points of the U-tubes, leading to a danger of failure due to stress-induced cracking and corrosion.

SUMMARY OF THE PRESENT INVENTION

It is therefore an object of the present invention to provide a single tube Coriolis type mass flowmeter that is vibrationally isolated from the external environment without using a costly, heavy, rigid support or mounting base structure.

Another object of the present invention is to provide a single tube Coriolis type mass flowmeter that is insensitive to differential temperature stresses and stresses due to pipeline distortion or movement.

Yet another object of the present invention is to provide a single tube Coriolis type mass flowmeter that is insensitive to the mounting configuration of the flowmeter.

Still another object of the present invention is to provide a single tube Coriolis type mass flowmeter that dynamically counterbalances internally generated Coriolis forces.

Briefly, a preferred embodiment of the present invention includes an elongated upstream inlet conduit section, an elongated downstream outlet conduit section laterally offset from the inlet conduit section, an inlet-outlet plate rigidly connecting the inlet and outlet conduit sections together at their proximate ends, and a continuous and generally helically wound length of conduit (approximately a 720 degree coil), the ends of which are respectively attached to the proximate ends of, or are continuations of, the inlet and outlet conduit sections. The conduit includes an upstream metering loop section and a downstream metering loop section joined together by a "floating" intermediate section. The embodiment further includes a plurality of sensors and one or more driver or oscillator devices. The upstream ends of each metering loop section are coupled by a first connecting plate, while the downstream ends of each metering loop section are coupled by a second connecting plate. The otherwise unsupported intermediate conduit section extending between the first and second connection plates connects the upstream metering loop section outlet to the downstream metering loop section inlet. The intermediate section and the inlet-outlet plate are not connected in any manner. Also, the plate connecting the inlet and outlet does not contact the other connection plates. The driver-oscillator device(s) is mounted between the two loop sections to impart equal and opposite exciting forces to the loop sections and the sensors are mounted between the loop sections to detect Coriolis force induced responses to the excited loop motions.

A primary advantage of the present invention is that it provides superior isolation of external forces (heretofore unrealized), including differential temperature stresses, and vibration from the sensitive metering loop sections. Since the inlet conduit and outlet conduit are connected together by the relatively rigid inlet-outlet plate, external pipeline "noise" tends to pass from one mounting flange to the other through the connected inlet and outlet conduit sections without materially affecting the metering loops.

Whereas the Yard and Back-Pedersen et al. designs attempt to isolate the flowmeter from the external vibration environment and decouple the metering loop sections from the support section by tying the inlets, the outlets, and the junction between the upstream and downstream metering loops into one rigid support or block, with the flowmeter inlet and outlet piping sections being mounted to a separate block, the present invention is distinguishable from these prior art devices in that although the inlets and outlets of each loop section are tied together, the section between the upstream and downstream loop sections (i.e., the intermediate section in the preferred embodiment) is not connected to any "inlet conduit-block-outlet conduit" structure that supports the flow sensing loops. As a consequence, the present invention provides a unique way of dynamically counterbalancing Coriolis and drive vibrational effects with the result that the measured Coriolis signal is free of drive and system noise and mounting configuration thereby permitting significantly more accurate flow rate measurements to be made than would otherwise be possible.

The present invention is further distinguishable from the U-shaped tube designs found in the Smith '450 device. In the present invention, conduit distortion resulting from the Coriolis forces is offset by dynamic vibrational reaction and movement of the floating intermediate section and plates 50 and 52. In contrast with the '450 patent, conduit distortion in the present invention is not offset by the "resilient deformation forces within the conduit." Thus, the mounting arrangement for the present invention functions differently than the cantilevered beam-like mounting disclosed in Smith '450. Additionally, since the open ends of the conduit of the present invention are not mounted to a support, the conduit section is not mounted in a cantilevered manner and thus does not extend from a support (of any type) in a cantilevered fashion.

Yet another advantage of the present invention is that it provides accurate flow rate measurements without being adversely sensitive to its mounting configuration, placement of piping supports, pipeline distortions or movement.

The Smith 31,450 patent teaches the significance of a U-shaped conduit mounted at its open ends to a support and extending from the support in a cantilevered fashion. In contrast to the '450 patent, the present invention uses a conduit that is a multi-loop 720-degree "coil" (as opposed to a U-tube) that is mounted and operated in a fundamentally different manner than the flowmeter disclosed in the '450 patent.

These and other objects and advantages of the present invention will no doubt become apparent to those skilled in the art after having read the following detailed description of the preferred embodiment illustrated in the several figures of the drawing.

IN THE DRAWING

FIG. 5 is a calibration graph depicting the performance of the device connected as shown in FIG. 4 when the device is subjected to externally generated vibrations;

FIGS. 6A through 6E illustrate the performance of the preferred embodiment with externally applied loads and Coriolis loads;

Figure 7A:
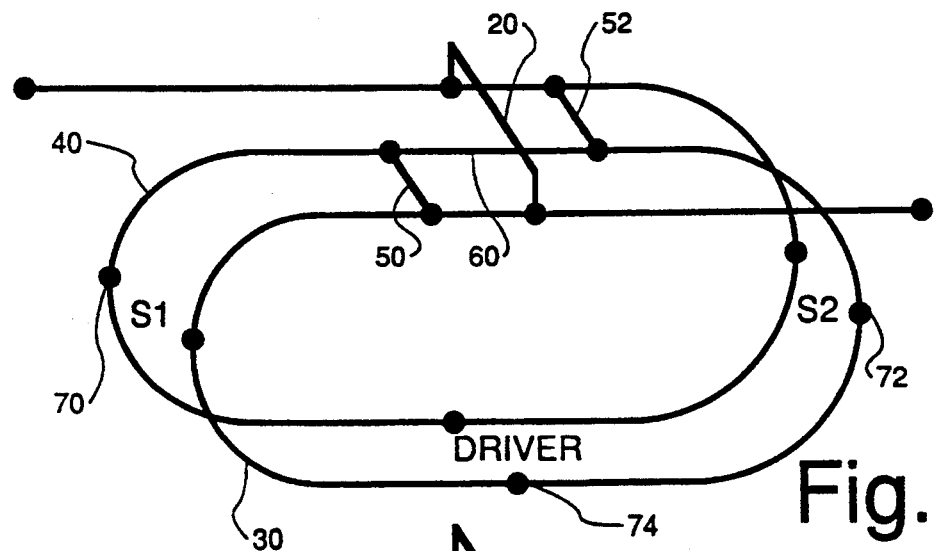
FIG. 7A is a diagram schematically depicting the preferred excitation mode for the present invention.
Figure 7B:
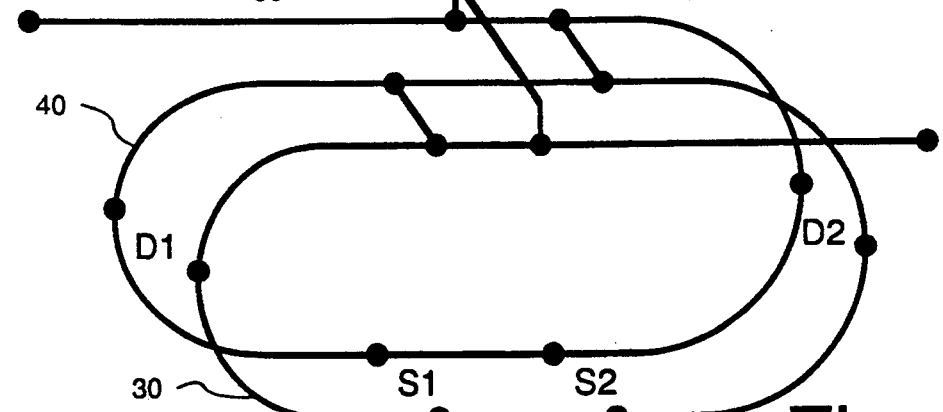
Figure 7C:
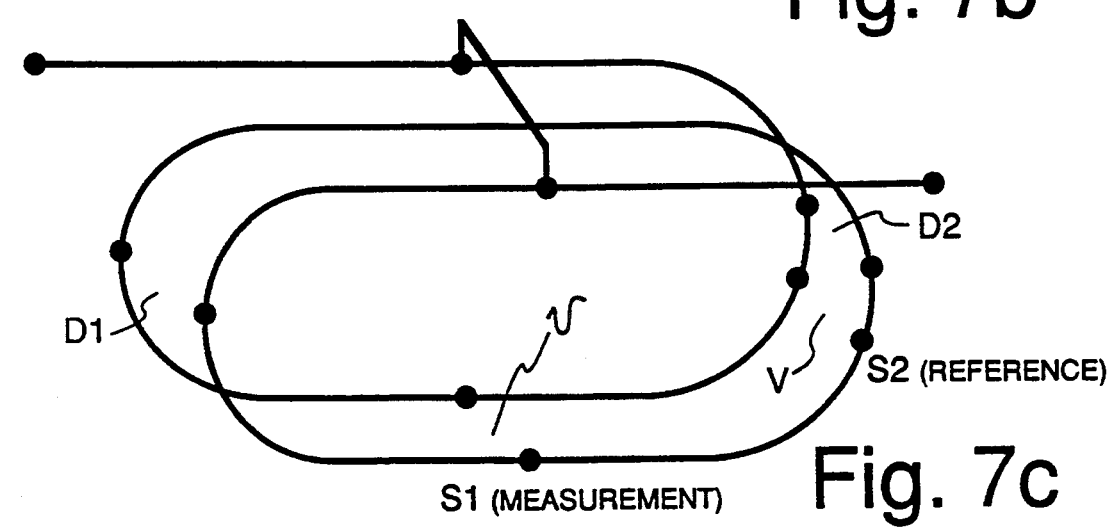
Figures 8A, 8B:
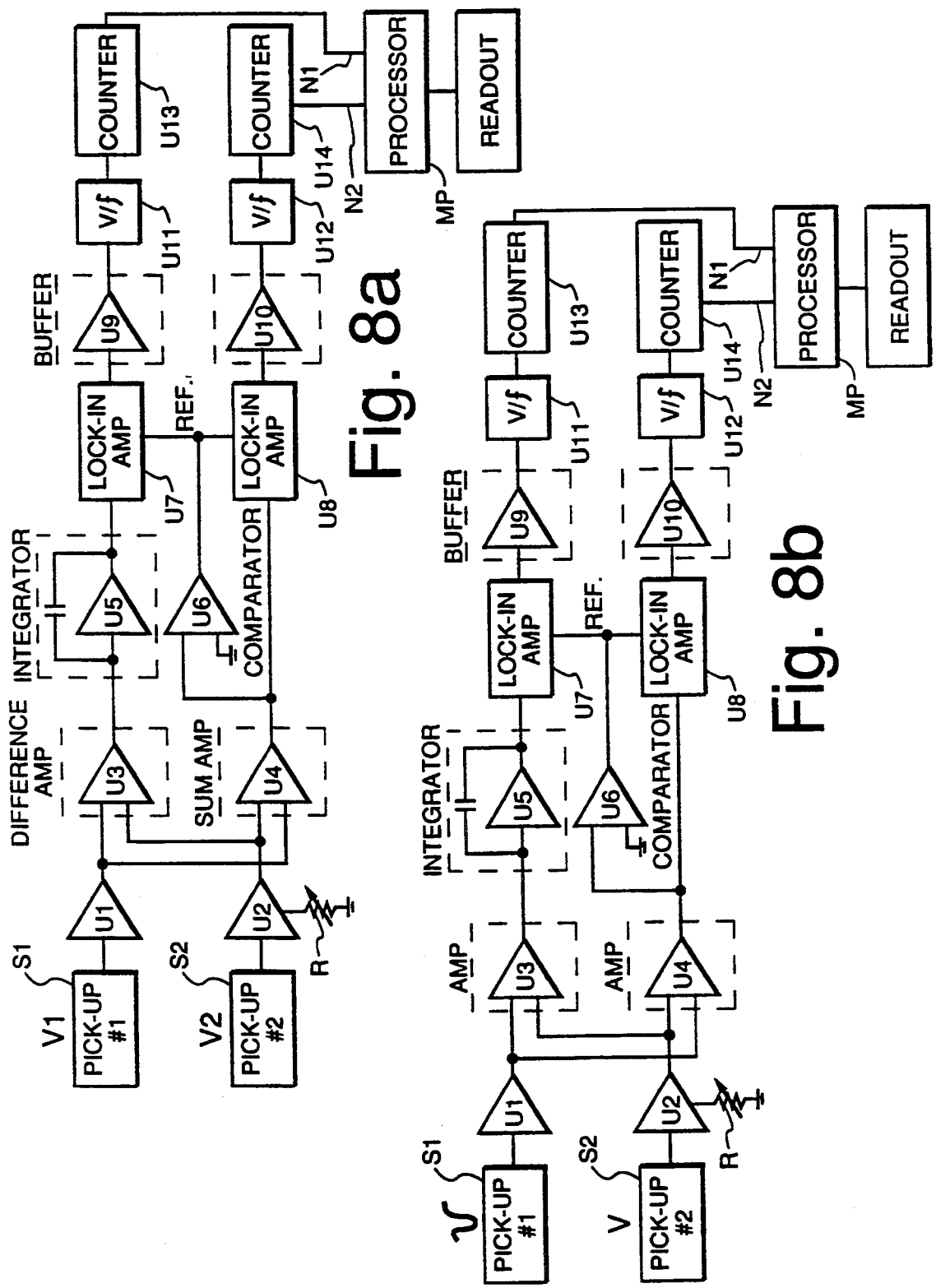

FIGS. 7B and 7C schematically depict alternate excitation modes for the present invention; and FIGS. 8A and 8B are block diagrams schematically illustrating circuits and methods for processing sensory input signals obtained from the excitation configurations shown in FIGS. 7A-7C.

DESCRIPTION OF THE PREFERRED EMBODIMENT

Figure 1:
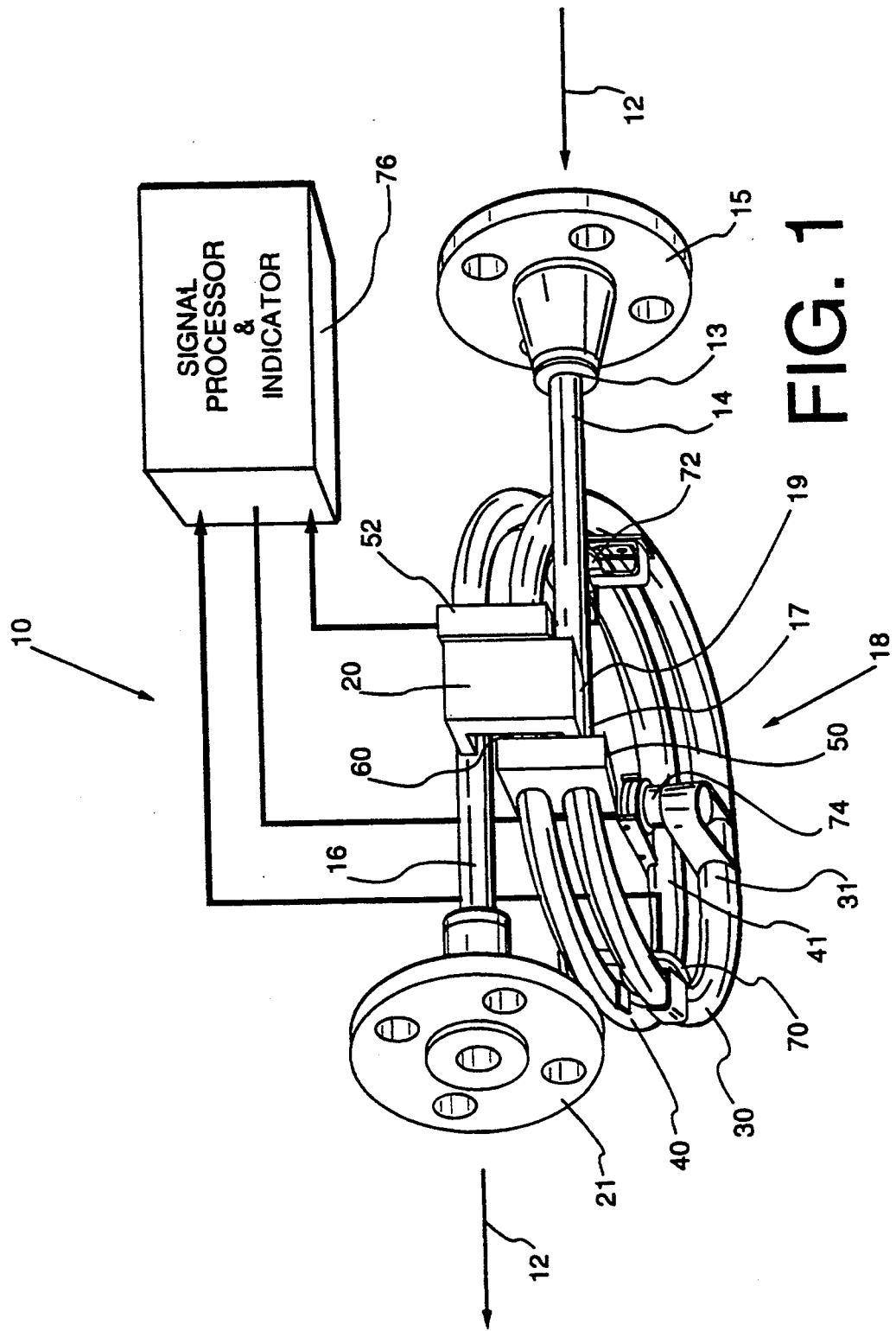
FIG. 1 illustrates the principal components of a preferred embodiment of the present invention.

Referring now to FIG. 1 of the drawing, there is shown a Coriolis type mass flow rate sensing device or "flowmeter" 10 with a flow direction through the meter illustrated by the arrows 12. The flowmeter 10 is comprised of an inlet conduit section 14, an outlet conduit section 16, an inlet-outlet connecting plate 20, and a flow rate sensing assembly 18. As noted in the figure, conduit sections 14 and 16, and the conduit of the assembly 18 are configured from one continuous length of tubing. The upstream end 13 of the conduit 14 is welded to a circular pipe flange 15 to facilitate coupling of the flowmeter to the mating flange (not shown) of an upstream pipeline, the throughput of which is to be measured. The opposite end portion 17 of conduit 14 is affixed (by welding) at 19 to the inlet-outlet plate 20. Conduit 16 is similarly connected between a flange 21 and the plate 20. These elements allow the flowmeter to be joined to a pipeline while at the same time providing a flexible connection to the sensing assembly 18 in a manner that flow rate measurement accuracy is not affected by thermal expansion or contraction of the elements between flanges 15 and 21.

The assembly 18 includes a single conduit comprised of an elongated upstream metering loop section 30, an elongated downstream metering loop section 40, an upstream connecting plate 50, and a downstream connecting plate 52, both welded to the loop sections 30 and 40, and a floating intermediate section 60. Although not essential to the operation of the apparatus, plates 50 and 52 serve as vibration termination plates for the loop sections 30, 40 and contribute to isolating drive motion from the inlet and outlet conduit sections 14 and 16.

A pair of sensors 70 and 72 are installed at opposite extremities of the elongated upstream and downstream metering loop sections 30, 40. A driver or oscillating device 74 is installed between the "backstretch" sections 31 and 41 of the loop sections 30, 40. The sensors 70, 72 and the driver device 74 are preferably of the type described by Young and Blake in U.S. Pat. Nos. 4,914,956 and 5,069,074 (hereinafter Young et al. '956 and '074). The sensors 70, 72 and the driver 74 are in electronic communication with a processing and indicating device 76. Device 76 also provides the drive energy for driver 74, and receives signals generated by the sensors 70, 72, and in response thereto develops mass flow rate and density information for recording or display.

Figure 2:
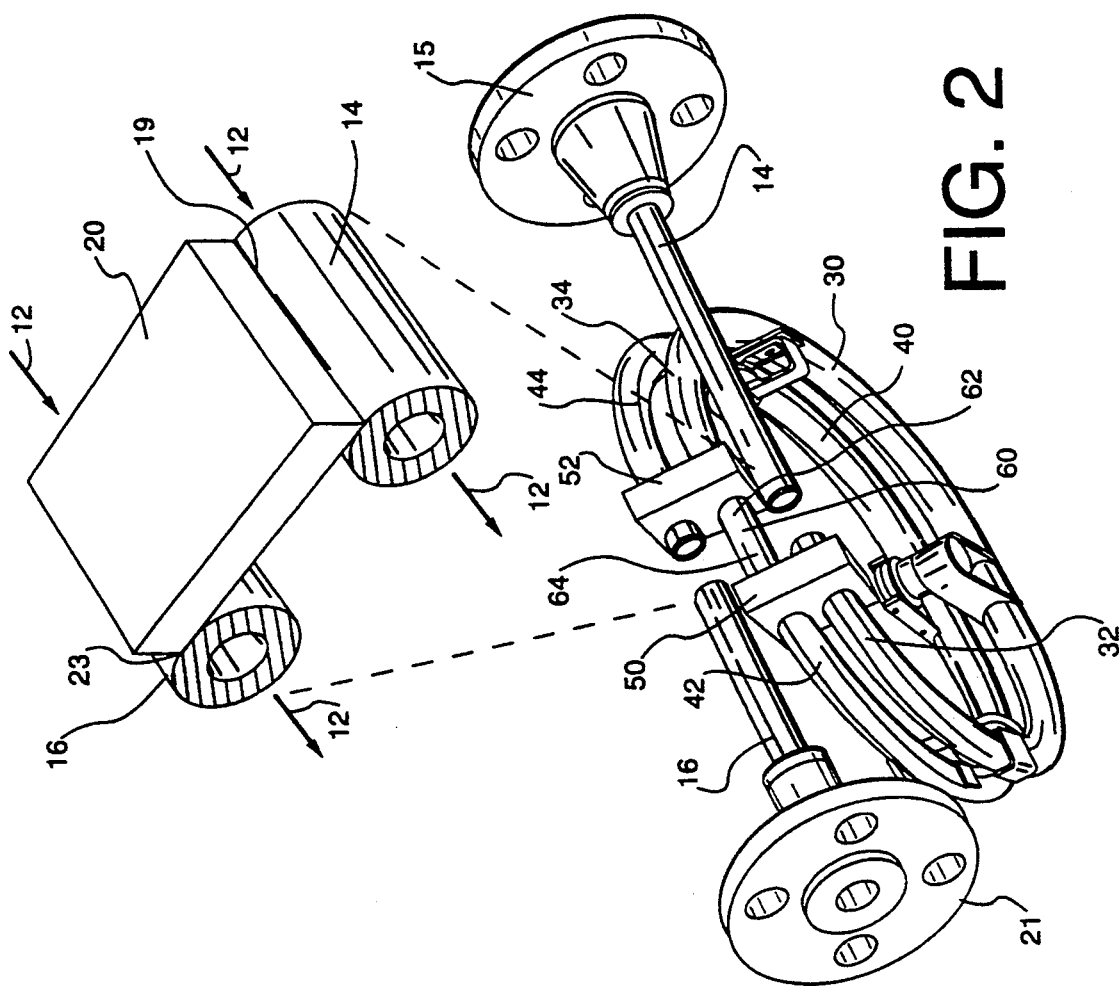
FIG. 2 is a partially broken isometric view illustrating the principal components of the embodiment of FIG. 1 with the connecting inlet-outlet plate and distal inlet and outlet conduit segments broken and exploded away.

Referring now to FIG. 2 of the drawing, an isometric view of the FIG. 1 embodiment is shown with the inlet-outlet plate 20 and adjacent ends of conduit 14 and 16 removed and exploded for clarity. The upstream plate 50 couples the inlet end 32 of the upstream metering loop section 30 to the inlet end 42 of the downstream metering loop section 40. Similarly, the downstream plate 52 couples the outlet end 34 from the upstream metering loop section 30 to the outlet end 44 of the downstream metering loop section 40. The junction between the upstream and downstream metering loop sections is formed by the intermediate section 60. The inlet end 62 of the intermediate section 60 is connected to the outlet end 34 of the upstream metering loop section 30, and the outlet end 64 of the intermediate section 60 is connected to the inlet end 42 of the downstream metering loop section 40. It will be appreciated from the figure that, as previously indicated, the inlet-outlet plate 20 is rigidly connected at 19 and 23, as by welding for example, to the inlet and outlet conduit sections 14, 16.

There are several important physical characteristics of the preferred embodiment of the present invention that should be noted. First, as illustrated in the figures, it is significant that the connecting plate 20 is not directly attached to the intermediate tube section 60, thereby allowing section 60 to move freely relative to plate 20. Second, the stiffness of the inlet-outlet plate 20 is greater than or equal to the stiffness of the conduit sections 14 and 16. Thus, externally generated vibrations and forces transferred into one of the conduit sections 14, 16 will pass through the plate 20 to the other conduit section and thereby be effectively isolated from the assembly 18. Third, the metering loop sections 30, 40 can be formed from either a single length of tubing (as depicted in FIGS. 1 and 2), or may be made up of a plurality of discrete tube lengths welded together in an appropriate fashion. Fourth, in the preferred embodiment the stiffness of the connecting plates 50, 52 need not be unreasonably large, but in general should have a stiffness on the order as that of the conduit forming loop sections 30 and 40. However, the plates 50, 52 need to be sufficiently flexible to couple Coriolis and drive vibrations into the intermediate section 60.

In accordance with a particular preferred embodiment, the metering loop sections 30 and 40 are laterally separated by a distance of 0.775 inches, the bend radii of the loops is 2.25 inches, the plates 50, 52 are separated by a distance of 2 inches, the distance from a spacing plate to the beginning of an adjacent bend in the metering loop is approximately 2 inches, and the tube diameter is 3/8 inch (outside diameter) with a 0.028 inch wall thickness.

Figure 3:
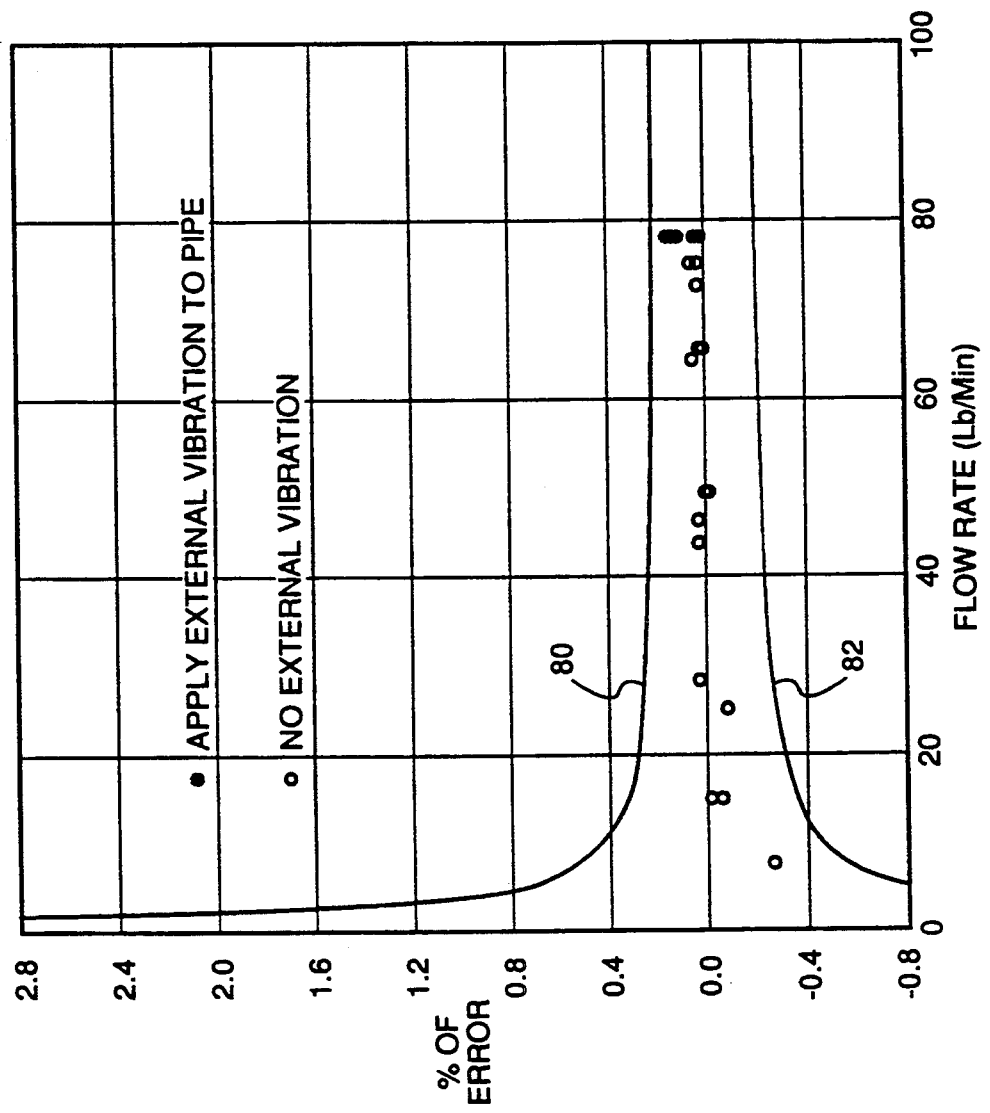
FIG. 3 is a calibration graph depicting performance of the preferred embodiment with and without externally applied vibrations.

Referring now to FIG. 3 which depicts a calibration graph for the preferred embodiment, actual measured flow rates are plotted as a percentage of error. Two different experimental conditions are depicted by the blackened circles and the open or white circles. As shown in the figure, the preferred embodiment's flow rate measurements are very accurate and are well within the error envelope defined by the curves 80, 82 regardless of whether external vibrations were present or not.

Figure 4:
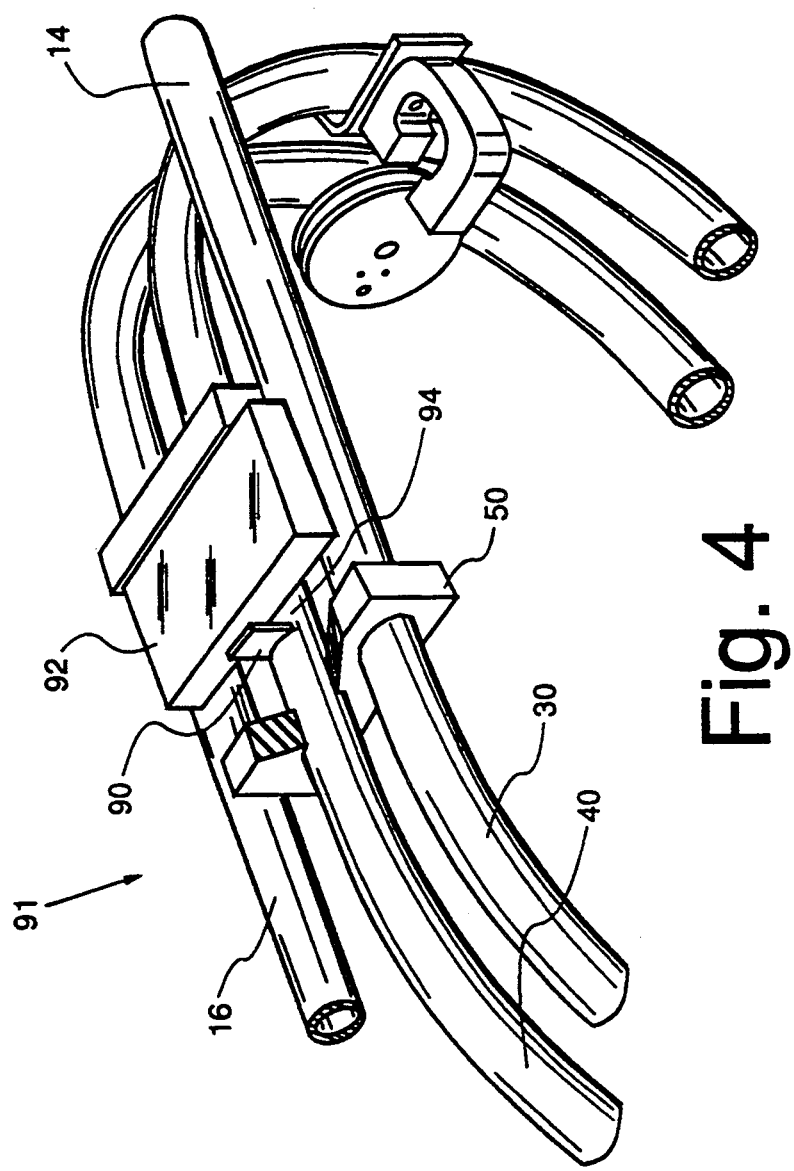
FIG. 4 illustrates a connection made in the preferred embodiment in order to demonstrate a principal feature of the present invention.

To further illustrate the functional effect of not having the section 60 connected to the inlet-outlet plate 20, as depicted at 91 in FIG. 4, an experimental flowmeter device was modified such that it differed from the preferred embodiment 10 only in that the inlet-outlet plate 20 was, for demonstrative purposes only, directly connected to the intermediate section 60. More particularly, the plate 92 is directly connected, through a connector piece 90, to the intermediate section 94; whereas in the preferred embodiment the inlet-outlet plate 20 (FIG. 1) is not connected in any way to the section 60. Taking measurements similar to those reported in FIG. 3, as indicated by the data in FIG. 5, the modified device 91 does not effectively isolate its metering section from externally generated vibrations and thus renders inaccurate flow rate measurements when vibrated.

As indicated in FIG. 5, two different experimental conditions are depicted by the blackened circles and the open or white circles. When the device 91 is not externally vibrated, it measures flow rates with sufficient accuracy such that the percentage of error (i.e., the open or white circles) at numerous flow rates fall well within the error envelope 80, 82 specified for the preferred embodiment 10. Thus, when there is no externally generated vibration present, connecting the plate 92 to the section 94 does not degrade performance. However, when the device 91 is externally vibrated (i.e., the inlet or outlet conduit sections are vibrated), the resulting flow rate measurements are inaccurate and the percentage of error at various magnitudes of external vibration fall well outside the error envelope 80, 82. It is therefore clear that connecting the plate 92 to the intermediate section 94 allows external vibrations to be coupled into the metering tube and substantially degrades performance of the device.

Figure 6A:
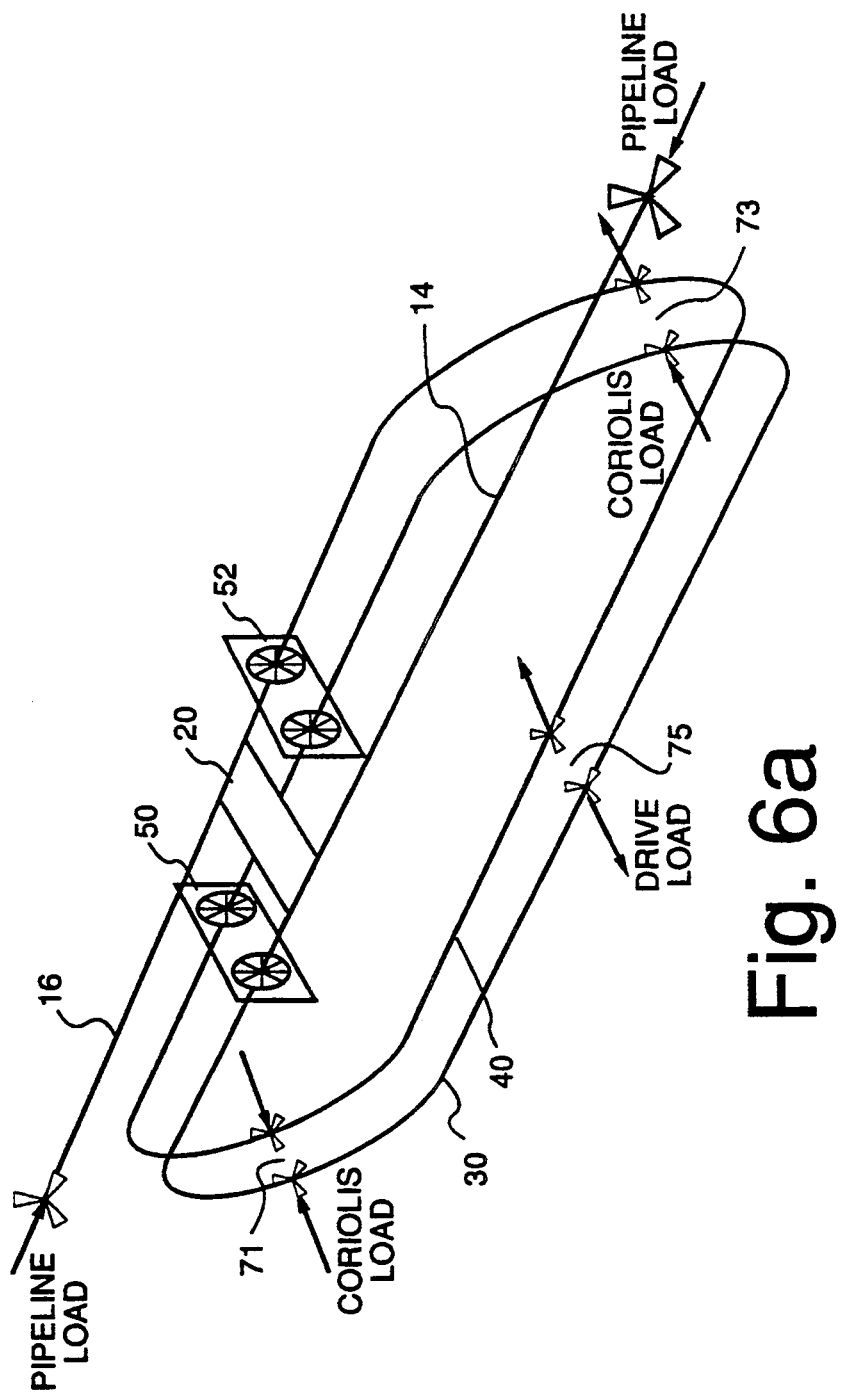
Figure 6B:
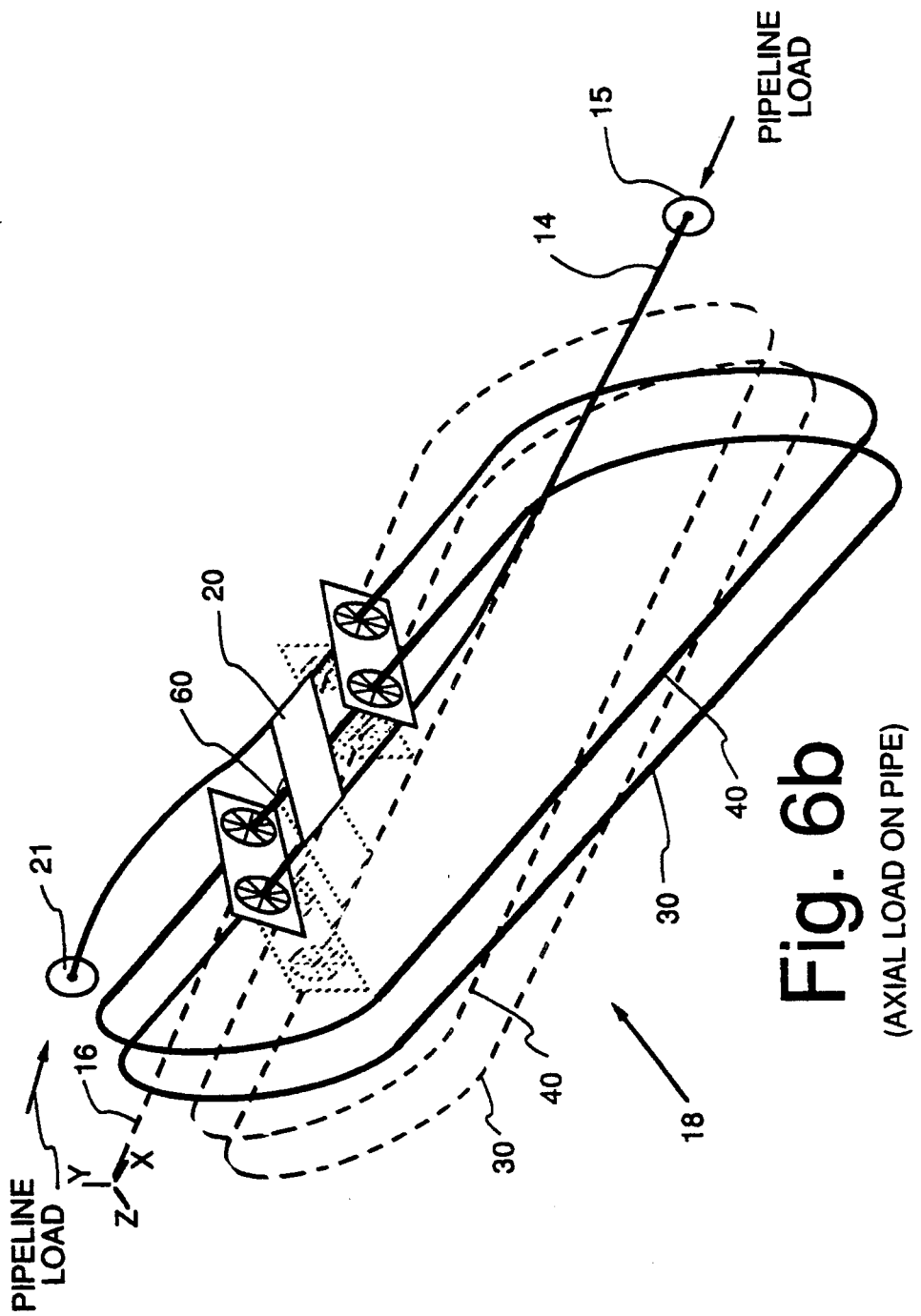

As a further illustration of the functional effect and benefit of mechanically isolating floating section 60 from the inlet-outlet plate 20, reference is made to FIG. 6A which shows a computer generated line drawing of the preferred embodiment, in an undeformed state. The figure illustrates the various types of loads that can be applied to the preferred embodiment during its normal operation, and further shows the location of each type of load, i.e. a Coriolis force load applied at locations 71 and 73, a pipeline load applied at the upstream end of section 14 and the downstream end of section 16, and a drive force load applied at location 75. FIG. 6B illustrates the deformation of the preferred embodiment during a no flow state but with pipeline loads applied at the flanges 15 and 21. For clarity and comparison the undeformed configuration of the flowmeter (as shown in FIG. 6A) is represented in FIG. 6B by dashed lines. It will be appreciated that, due to the externally applied pipeline loads, conduit section 16 and 14 are no longer parallel with each other and are in fact bowed in response to the pipeline force. Note that as the conduit sections 14 and 16 deform, plate 20 rotates causing the loop sections 30 and 40 to correspondingly rotate as indicated. However, since the section 60 is not connected to the plate 20, the loop sections 30 and 40, although skewed from their original positions, still retain their same positions relative to one another (in part due to plates 50 and 52) and do not experience the pipeline load. Thus, in contrast to the '450 patent that teaches solidly mounting the open ends of the conduit to a support, in the present invention the open ends of the sensing conduit are flexibly mounted and static loads or thermally induced stresses are isolated from and will not interfere with operation of the sensing assembly 18.

Figure 6C:
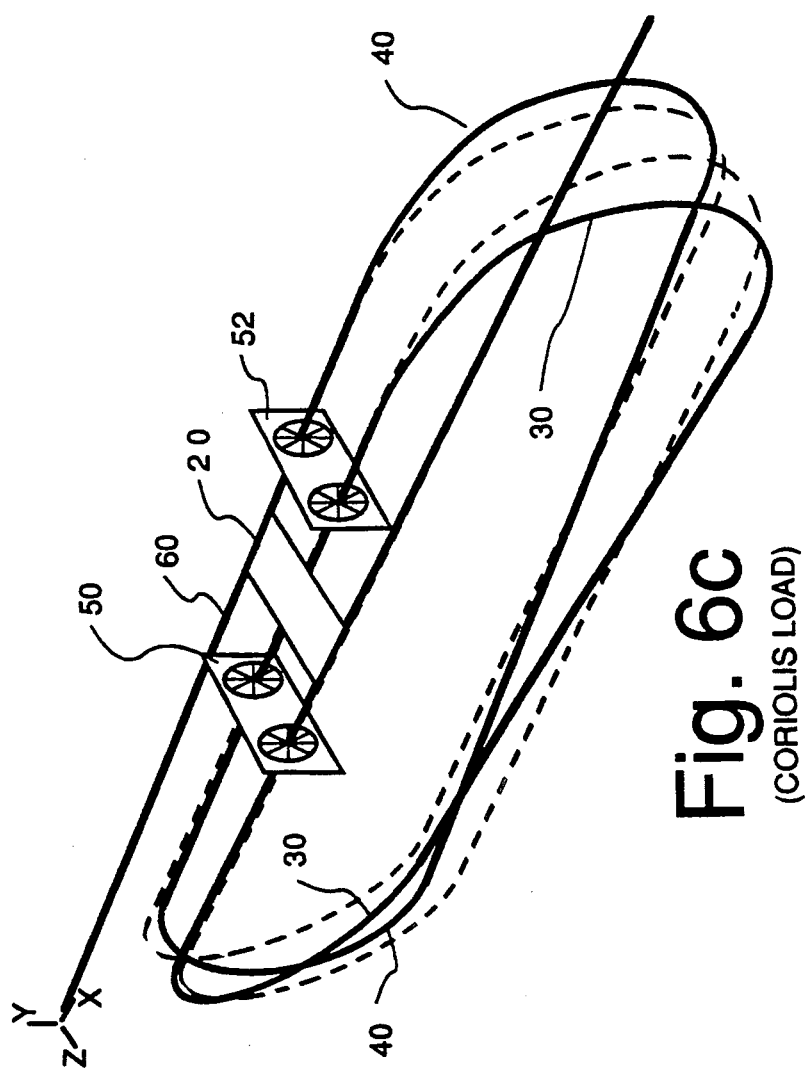

The functional effect of the absence of mechanical connection between section 60 and inlet-outlet plate 20 is more dramatically illustrated when the flowmeter is in the dynamic or flow state. FIG. 6C depicts the deformations induced in the loops 30 and 40 due to the Coriolis forces generated by fluid passing through the loop sections 30 and 40. The undeformed configuration of the flowmeter as shown in FIG. 6A is represented by dashed lines. FIG. 6D is a magnified view of the upper portion of the deformed flowmeter illustrated in FIG. 6C schematically showing plate 20 and focusing primarily on section 60 and connecting plates 50 and 52. As the internally generated Coriolis forces are developed and the loop sections 30 and 40 are deformed in anti-phase relationship, they tend to deform plates 50 and 52 as depicted. As a result, stresses are developed in the linking section 60 causing it to deform as shown. As a consequence of the energy periodically stored and released in section 60 (and connectors 50 and 52), a dynamic counterbalancing of the Coriolis forces is achieved making the measured Coriolis signal free of drive and internal system noise thereby permitting significantly more accurate flow rate measurements to be made.

In contrast, as indicated in FIG. 6E, when the section 94 is directly connected to the bracket 92 (in the manner suggested in FIG. 4), the entering Coriolis forces are not counterbalanced and are transmitted into section 94 and out to conduit sections 14 and 16. By the same token it will be appreciated that external vibrational noise may also be transmitted into the loops via section 94 thereby causing erroneous Coriolis signals and consequent inaccurate flow rate measurements.

Historically, prior art meters require solidly mounting the flow sensing conduit to a support or base to prevent movement of the conduit ends (e.g., Smith '450 or Cox '028). In the present invention (with reference to FIG. 2), end 32 is permitted to move relative to end 34 and end 42 is free to move relative to end 44. This freedom of movement of the conduit ends is a result of the fact that plate 20 does not connect to intermediate section 60, the placement of plates 50 and 52 on the sensitive portion of the meter 18, and the absence of a common block or support for all sections of the conduit. Because of these considerations, and the way the conduit is mounted, and in further contrast to the Smith '450 and the Cox '028 patents, the flowmeter of the present invention does not comprise a tuning-fork arrangement or structure.

In the preferred mode of operation, the driver 74 and sensors 70, 72 are disposed in the configuration schematically depicted in FIG. 7A. In this configuration the driver 74 includes a magnet and coil pair centrally located on the backstretch portions of the loops and energized with an externally generated AC signal. This driver typically excites the two metering loop sections 30, 40 to vibrate relative to one another in an anti-phase relationship in the "fundamental" mode of vibration. Vibrational motion sensing pick-ups $S_1$ (70) and $S_2$ (72) are normally located on opposite sides of the driver 74 at the loop extremities. As the conduit is excited, any Coriolis or drive components passing through the connecting plates 50, 52 will enter into the intermediate section 60. Given that such components will enter each end of section 60 in approximately equal but opposite directions and magnitudes, the intermediate section 60 will dynamically counterbalance these Coriolis and drive vibrations with the result that the measured Coriolis signal is free of drive and internal system noise, and mechanical coupling to the piping external to the meter, thereby permitting significantly more accurate flow rate measurements than would otherwise be possible.

The sensors $S_1$ and $S_2$ sense relative velocity of the metering loop sections and develop voltages $V_1$ and $V_2$ respectively, rather than directly sensing Coriolis forces or their magnitudes, to determine flow rate. The preferred embodiment uses a signal processing approach based on the use of velocity signals as described in Sipin '944 and '098 and as further improved by Young '956, and the disclosure of Young '956 is herein incorporated by reference.

Briefly, the following illustrates how the driver-sensor configuration (schematically depicted in FIG. 7A), in combination with a signal processing circuit such as that shown in FIG. 8A, determines the mass flow rate through the flowmeter. The symbols assigned to the variables may be the same in the preferred configuration schematically depicted in FIG. 7A, as in other alternative configurations. However, no implication is made regarding the relative magnitude of a given variable from one configuration to another.

$V_1$, $V_2$: represent signals proportional to the relative velocity of motion at the location of the associated sensor.

$A_D$: is proportional to the peak amplitude of relative movement at the sensing location due only to drive excitations.

$A_C$: is proportional to the peak amplitude of relative movement at the sensing location as a result of the Coriolis force distributed along the conduit sections.

w: is proportional to the drive frequency expressed in radians/second.

t: is time in seconds.

F(wt): represents the periodic behavior of the relative positional displacement of the sensor conduit sections over time at a given sensing location due to drive excitation. It may be sinusoidal, it may be highly distorted alternating signal, but in general it need only be a periodic function of time, i.e.

$$F(wt + 2 \times \pi) = F(wt).$$

dm/dt: represents mass flow rate in units of mass/time.

k: proportionality constant that depends on temperature.

k': proportionality constant that represents the meter calibration factor for a given sensor configuration.

V: represents a signal proportional to the relative velocity of movement at the sensor location due to drive excitation only.

v: represents a signal proportional only to the relative velocity of movement of the two segments relative to the pick-up coil in response to Coriolis forces.

$<>$: RMS or average voltage.

For the preferred configuration schematically illustrated in FIG. 7A, the equations are as follows:

No flow condition: $V_1 = V_2 = A_D \times dF(wt)/dt$

Flow condition:

$V_1 = A_D \times dF(wt)/dt - A_C \times dF(wt + \pi/2)/dt$ $V_2 = A_D \times dF(wt)/dt + A_C \times dF(wt + \pi/2)/dt$ $A_C = k \times A_D \times w \times dm/dt$ $dm/dt = k' \times <\int(V_2 - V_1) \times dt>/<V_2 + V_1>$ As suggested above, these equations can be implemented by a signal processing system of the type schematically depicted in FIG. 8A and fully described in Young '956.

Although a Coriolis type mass flowmeter with a straight inlet conduit section 14 and a straight outlet conduit section 16 oriented in parallel with section 14 has been illustrated as the preferred embodiment, these conduit sections can be configured to extend in any orientation without substantially affecting the operation of the measuring loops. For example, the inlet and outlet sections 14, 16 can be skewed relative to each other, or could be bent at various angles without materially affecting the operation of the flowmeter.

Although a flowmeter with a single driver device 74 located opposite plate 20 and two sensor devices 70, 72 located at opposite extremities of the loop sections 30, 40 has been illustrated as the preferred embodiment, as an alternative, the metering loop sections 30, 40 could be excited by a pair of "drivers" $D_1$ and $D_2$ located on opposite sides of the loop sections and operated 180 degrees out of phase with each other causing the two loops to twist relative to each other in an anti-phase relationship in the conduit's "first harmonic" mode. The resulting vibrational motion would normally be monitored by two suitable pick-ups $S_1$ and $S_2$ displaced from one another as depicted in FIG. 7B. For this alternative configuration, the operative equations illustrating this mode of operation are as follows:

No flow condition:

$V_1 = -A_D \times dF(wt)/dt$ $V_2 = A_D \times dF(wt)/dt = -V_1$

Flow condition:

$V_1 = -A_D \times dF(wt)/dt + A_C \times dF(wt + \pi/2)/dt$ $V_2 = A_D \times dF(wt)/dt + A_C \times dF(wt + \pi/2)/dt$ $A_C = k \times A_D \times w \times dm/dt$ $dm/dt = k' \times <\int(V_2 + V_1) \times dt>/<V_2 - V_1>$ The output signals $V_1$ and $V_2$ from the sensors $S_1$ and $S_2$ in the embodiment illustrated in FIG. 7B may be processed by a circuit similar to the type illustrated in FIG. 8A, but with the roles of the summing amp and the differencing amp interchanged. See Young '074.

Another alternative embodiment would feature exciting the conduit to vibrate in its "first harmonic" mode using a pair of drivers $D_1$ and $D_2$ as shown in FIG. 7C, with one motion sensing pick-up $S_1$ located centrally on the conduit and generating an output measurement signal "v", and another motion pick-up $S_2$ located on one side of the conduit sensitive only to driving motion and generating a reference signal "V". The equations for the configuration schematically shown in FIG. 7C are as follows:

No flow condition:

$v = 0$ $V = A_D \times dF(wt)/dt$

Flow condition:

$v = A_C \times dF(wt + \pi/2)/dt$ $V = A_D \times dF(wt)/dt$ $A_C = k \times A_D \times w \times dm/dt$ $dm/dt = k' \times <\int v\, dt> / <v>$ The output signals "V" and "v" obtained from this embodiment may be processed by a circuit of the type schematically illustrated in FIG. 8B and fully described in Young et al. '956 and '074. In this case, "v" is analogous to the difference signal, and "V" is analogous to the sum referred to in describing the operation of the embodiment of FIG. 8A.

Although a preferred embodiment of the present invention and several alternatives have been disclosed above, it will be appreciated that numerous alterations and modifications thereof will no doubt become apparent to those skilled in the art after having read the above disclosures. It is therefore intended that the following claims be interpreted as covering all such alterations and modifications as fall within the true spirit and scope of the invention.

What is claimed is:

1. An apparatus for measuring the mass flow rate of a material flowing through a pipeline, comprising:
   a first length of conduit forming an inlet passageway and having a first inlet end for connection to an upstream part of said pipeline and a first outlet end;
   a second length of conduit forming an outlet passageway and having a second inlet end and a second outlet end for connection to a downstream part of said pipeline;
   connecting plate means connecting said first outlet end to said second inlet end;
   upstream metering means including a third length of conduit having a third inlet end and a third outlet end, said third inlet end being communicatively connected to said first outlet end;
   downstream metering means including a fourth length of conduit having a fourth inlet end and a fourth outlet end, said fourth outlet end being communicatively connected to said second inlet end;
   a fifth length of conduit connecting said third outlet end of said third length of conduit to said fourth inlet end of said fourth length of conduit, said fifth length of conduit being free to move relative to said connecting plate means;
   a discrete upstream termination plate for connecting said third inlet end and said fourth inlet end;
   a discrete downstream termination plate for connecting said third outlet end and said fourth outlet end;
   driver means for causing said upstream metering means to vibrate relative to said downstream metering means;
   sensor means for detecting the relative motion between said upstream metering means and said downstream metering means caused by Coriolis induced forces developed therein, and operative to develop corresponding electrical signals; and
   signal processing means responsive to said electrical signals and operative to develop an indication of the mass flow rate of material flowing through said lengths of conduit.

2. An apparatus for measuring the mass flow rate of a material flowing through a pipeline as recited in claim 1 wherein said upstream termination plate and said downstream termination plate are disposed on opposite sides of said connecting plate means.

3. An apparatus for measuring the mass flow rate of a material flowing through a pipeline as recited in claim 2 wherein said driver means operates to oscillate said third length of conduit and said fourth length of conduit against one another in an anti-phase relationship.

4. An apparatus for measuring the mass flow rate of a material flowing through a pipeline as recited in claim 3 wherein said third and fourth lengths of conduit form generally oval shaped loops disposed in side-by-side relationship and said sensing means includes a first sensor disposed at one extremity of said loops and a second sensor disposed at an opposite extremity of said loops.

5. An apparatus for measuring the mass flow rate of a material flowing through a pipeline as recited in claim 2 wherein said third and fourth lengths of conduit form generally oval shaped loops disposed in side-by-side relationship and said driver means includes a first driver disposed at one extremity of said loops and a second driver disposed at an opposite extremity of said loops, said first driver and said second driver being caused to operate 180 degrees out of phase relative to each other causing the loop formed by said first length of conduit and the loop formed by said second length of conduit to twist relative to one another in an anti-phase relationship.

6. An apparatus for measuring the mass flow rate of a material flowing through a pipeline as recited in claim 5 wherein said sensing means includes a first sensor and a second sensor disposed at spaced apart locations on a common side of said loops, said first sensor being nearer said first driver, and said second sensor being nearer said second driver.

7. An apparatus for measuring the mass flow rate of a material flowing through a pipeline as recited in claim 5 wherein said sensing means includes a measurement sensor disposed on the side of said loops opposite said connecting plate means and operative to generate a measurement voltage signal, and a reference sensor disposed proximate either said first driver or said second driver, and operative to generate a reference voltage signal.

8. An apparatus for measuring the mass flow rate of a material flowing through a pipeline as recited in claim 1 wherein said first length of conduit is oriented parallel to said second length of conduit but is longitudinally and laterally offset relative thereto.

9. An apparatus for measuring the mass flow rate of a material flowing through a pipeline as recited in claim 8 wherein said upstream termination plate and said downstream termination plate are disposed on opposite sides of said connecting plate means.

10. An apparatus for measuring the mass flow rate of a material flowing through a pipeline as recited in claim 9 wherein said driver means operates to oscillate said third length of conduit and said fourth length of conduit against one another in an anti-phase relationship.

11. An apparatus for measuring the mass flow rate of a material flowing through a pipeline as recited in claim 10 wherein said third and fourth lengths of conduit form generally oval shaped loops disposed in side-by-side relationship and said sensing means includes a first sensor disposed at one extremity of said loops and a second sensor disposed at an opposite extremity of said loops.

12. An apparatus for measuring the mass flow rate of a material flowing through a pipeline as recited in claim 9 wherein said third and fourth lengths of conduit form generally oval shaped loops disposed in side-by-side relationship and said driver means includes a first driver disposed at one extremity of said loops and a second driver disposed at an opposite extremity of said loops, said first driver and said second driver being caused to operate 180 degrees out of phase relative to each other causing the loop formed by said first length of conduit and the loop formed by said second length of conduit to twist relative to one another in an anti-phase relationship.

13. An apparatus for measuring the mass flow rate of a material flowing through a pipeline as recited in claim 12 wherein said sensing means includes a first sensor and a second sensor disposed at spaced apart locations on a common side of said loops, said first sensor being nearer said first driver, and said second sensor being nearer said second driver.

14. An apparatus for measuring the mass flow rate of a material flowing through a pipeline as recited in claim 11 wherein said sensing means includes a measurement sensor disposed on the side of said loops opposite said connecting plate means and operative to generate a measurement voltage signal, and a reference sensor disposed proximate either said first driver or said second driver, and operative to generate a reference voltage signal.

15. An apparatus for measuring the mass flow rate of a material flowing through a pipeline as recited in claim 1 wherein said first, second, third, fourth and fifth lengths of conduit are segments of a single continuous piece of conduit.

16. An apparatus for measuring the mass flow rate of a material flowing through a pipeline as recited in claim 8 wherein said first, second, third, fourth and fifth lengths of conduit are segments of a single continuous piece of conduit.

17. An apparatus for measuring the mass flow rate of a material flowing through a pipeline, comprising:
a continuous conduit adapted for serial attachment to the pipeline and including
a first portion of the conduit forming an inlet passageway and having an inlet and an outlet, the inlet of said first portion being connectable to the pipeline;
a second portion of the conduit forming an outlet passageway and having an inlet and an outlet, the outlet of said second portion being connectable to the pipeline; and
a third portion of the conduit forming an approximate 720-degree helical coil with an inlet communicating with the outlet of said first portion and with an outlet communicating with the inlet of said second portion, said third portion having an intermediate section disposed adjacent and between the inlet and outlet of said third portion., said intermediate section having an inlet and an outlet;
first plate means connecting the outlet of the first portion to the inlet of the second portion, said intermediate section being left free to move relative to said first plate means;
second plate means connecting the outlet end of said first conduit portion to the outlet of said intermediate section;
third plate means connecting the inlet end of said second conduit portion to the inlet of said intermediate section;
driver means for vibrating corresponding sections of each loop of said coil in opposition to each other;
sensor means for detecting relative motion between corresponding sections of each loop of said coil and for generating electrical signals commensurate therewith; and
signal processing means responsive to said electrical signals and operative to develop an indication of mass flow rate flowing through said conduit.

18. An apparatus for measuring the mass flow rate of a material flowing through a pipeline, comprising:
a first length of straight conduit forming an inlet passageway and having a first inlet end for connection to an upstream part of said pipeline and a first outlet end;
a second length of straight conduit forming an outlet passageway and having a second inlet end and a second outlet end for connection to a downstream part of said pipeline, said second length of conduit being disposed in longitudinally offset but parallel relationship with said first length of conduit, said first outlet end being positioned proximate said second inlet end, and said first inlet end being positioned remote from said first outlet end;
connecting plate means rigidly connecting said first outlet end to said second inlet end;
upstream metering means including a third length of conduit having a third inlet end and a third outlet end, said third inlet end being communicatively connected to said first outlet end;
downstream metering means including a fourth length of conduit having a fourth inlet end and a fourth outlet end, said fourth outlet end being communicatively connected to said second inlet end;
a discrete upstream termination plate for connecting said third inlet end and said fourth inlet end;
a discrete downstream termination plate for connecting said third outlet end and said fourth outlet end;
a fifth length of conduit connecting said third outlet end of said third length of conduit to said fourth inlet end of said fourth length of conduit, said fifth length of conduit being free to move relative to said connecting plate means;
driver means for causing said upstream metering means to vibrate relative to said downstream metering means;
sensor means for detecting the relative motion between said upstream metering means and said downstream metering means caused by Coriolis induced forces developed therein, and operative to develop corresponding electrical signals; and
signal processing means responsive to said electrical signals and operative to develop an indication of the mass flow rate of material flowing through said lengths of conduit.

* * * * *